Aug. 31, 1926.

M. P. GRAHAM 1,597,965

DRAG LINK ELEMENT

Filed Jan. 11, 1923

INVENTOR:
M. P. GRAHAM
BY
ATTORNEY

Patented Aug. 31, 1926.

1,597,965

UNITED STATES PATENT OFFICE.

MATTHEW P. GRAHAM, OF DETROIT, MICHIGAN, ASSIGNOR TO THE STEEL PRODUCTS COMPANY, OF CLEVELAND, OHIO, A CORPORATION OF OHIO.

DRAG-LINK ELEMENT.

Application filed January 11, 1923. Serial No. 612,144.

My invention relates to the main elements of drag-links, tie-rods or similar devices including in their construction an end tubular socket.

The object of the invention is to provide a simple and efficient socket construction which will meet the necessary requirements of the art in which the article is used.

The said invention consists of a socket construction hereinafter fully described and particularly set forth in the claims.

Heretofore drag-links and the like have been provided with an end socket by upsetting or otherwise forming the end of the stock so as to produce an end cup-shaped flange to which a tubular socket member was then welded. As a result of the welding operation the molten metal flowed inwardly and had later to be removed so as to prepare the interior of the socket for the reception of other associated elements such as a spring, bearing-blocks etc. This operation added an undesirable expense to the cost of manufacture.

A specific object of the invention, therefore, is to produce a socket construction which will eliminate the necessity of removing this intruded metal.

This object I accomplish by upsetting the end portion of the stock to form a cup-shaped flange which joins the main or body-portion of the link, intermediately of the ends of said body portion terminating in a plane intersecting said main or body portion, and then welding the socket member to said flange. A boss is thus produced which extends into the socket cavity beyond the weld-joint which forms an abutment for the said associated elements, thereby eliminating the necessity of removing the intruded metal from the interior.

The annexed drawing and the following description set forth certain means and a method embodying my invention, the disclosure however, constituting but one of various ways in which the principle of my invention may be applied.

Figure 1:
Fig. 1 represents the end portion of a piece of blank cylindrical bar-stock from which the main or body member of the drag-link element is made.
Figure 2:
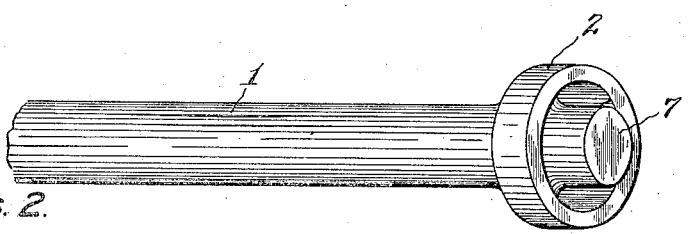
Fig. 2 represents a perspective view of the end portion of said main member after the flange has been formed thereon.
Figure 3:
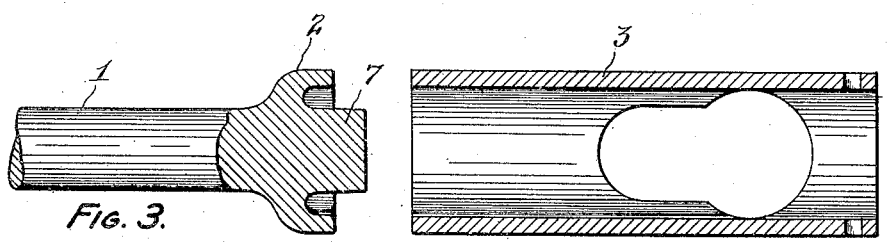
Fig. 3 represents an axial sectional view of said end portion and a tubular socket member, before the welding operation has been effected.

In practicing my invention I take a piece of steel bar-stock 1 of suitable composition, and upset the end portion thereof either hot or cold, to form a cup-shaped flange 2 which joins the member, as shown in Fig. 3, at a distance from the end of the member and terminates in a plane intersecting said member.

Figure 4:
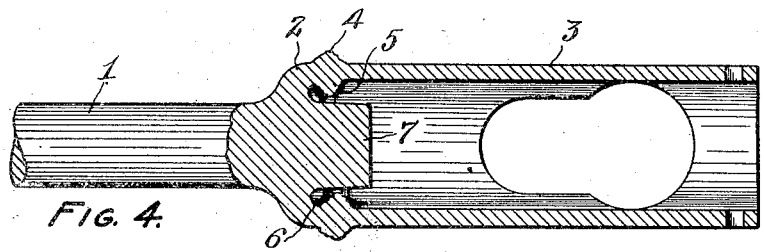
Fig. 4 represents an axial sectional view after the welding operation has been effected.
Figure 5:
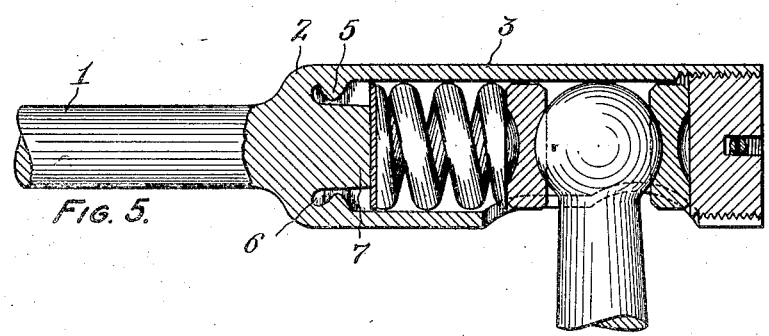
Fig. 5 represents an axial sectional view of the finished drag-link element and associated parts.

A tubular socket member 3, of the required length and of the same diameter and thickness as the end of the flange 2, is then butt-welded to said flange as shown in Fig. 4. The molten metal flows inwardly and outwardly at the joint and forms an interior and an exterior burr as shown. The exterior burr 4 is then removed by grinding. The interior burr 5 is formed in the annular space 6 surrounding the end or boss 7. This boss is made of sufficient length to project into the socket cavity beyond the weld-joint and forms the abutment for the interior elements of the drag-link or tie-rod, as shown in Fig. 5.

It will be noted that the said boss removes the requirement of placing any of said interior elements adjacent to the weld-joint, and the necessity of removing the interior burr is hence eliminated.

Claims covering the method herein disclosed are included in a separate application filed by me on March 15th, 1924, and bearing Serial No. 699,403.

What I claim is:

1. An element of the class described consisting of a body-member having its end portion formed with a cup-shaped flange terminating in a plane intersecting said end portion; and a tubular socket-member welded to said flange.

2. An element of the class described consisting of a body-member provided with an end tubular socket having a welded joint intermediate of the socket's ends, and a boss projecting into the socket cavity and beyond said joint.

Signed by me this 3rd day of January, 1923.

MATTHEW P. GRAHAM.